United States Patent [19]

Müller et al.

[11] Patent Number: 4,533,184

[45] Date of Patent: Aug. 6, 1985

[54] DISC WHEEL WITH VENTILLATION PASSAGES

[75] Inventors: Alf Müller, Waiblingen; Hermann Schobbe, Fellbach; Bernd Löper, Korb; Hartmut Binnewies, Wolfschlugen, all of Fed. Rep. of Germany

[73] Assignee: Daimler-Benz Aktiengesellschaft, Stuttgart, Fed. Rep. of Germany

[21] Appl. No.: 492,057

[22] Filed: May 6, 1983

[30] Foreign Application Priority Data

May 8, 1982 [DE] Fed. Rep. of Germany ....... 3217458

[51] Int. Cl.³ .................. B60B 3/12; B60B 3/04; B60B 3/00
[52] U.S. Cl. .................. 301/63 R; 301/65
[58] Field of Search .................. 301/63 R, 64 SD, 65, 301/67, 6 CS

[56] References Cited

U.S. PATENT DOCUMENTS 4,361,358 11/1982 Bonniwell .................. 301/65

FOREIGN PATENT DOCUMENTS 1230169 4/1971 United Kingdom .................. 301/65

Primary Examiner—David A. Scherbel
Assistant Examiner—Dennis C. Rodgers
Attorney, Agent, or Firm—Barnes & Thornburg

[57] ABSTRACT

Wheel for motor vehicles of the type which is cast or forged in one piece and composed of a light metal alloy and possessing a rim and a wheel disc with a radial clearance between the rim and the periphery of the wheel disc. Ventilation apertures are defined by the radial clearance and radially extending connecting webs bridging same. In order to provide an outer appearance which is aesthetically pleasing and to limit soiling of the wheel by brake friction material while facilitating a strong light weight construction the ventilation apertures extend radially so they are not visible as open windows from the front, a stiffening ring at the wheel disc forms a connection base for the connecting webs, which ring is severed at spaced locations during manufacture.

12 Claims, 4 Drawing Figures

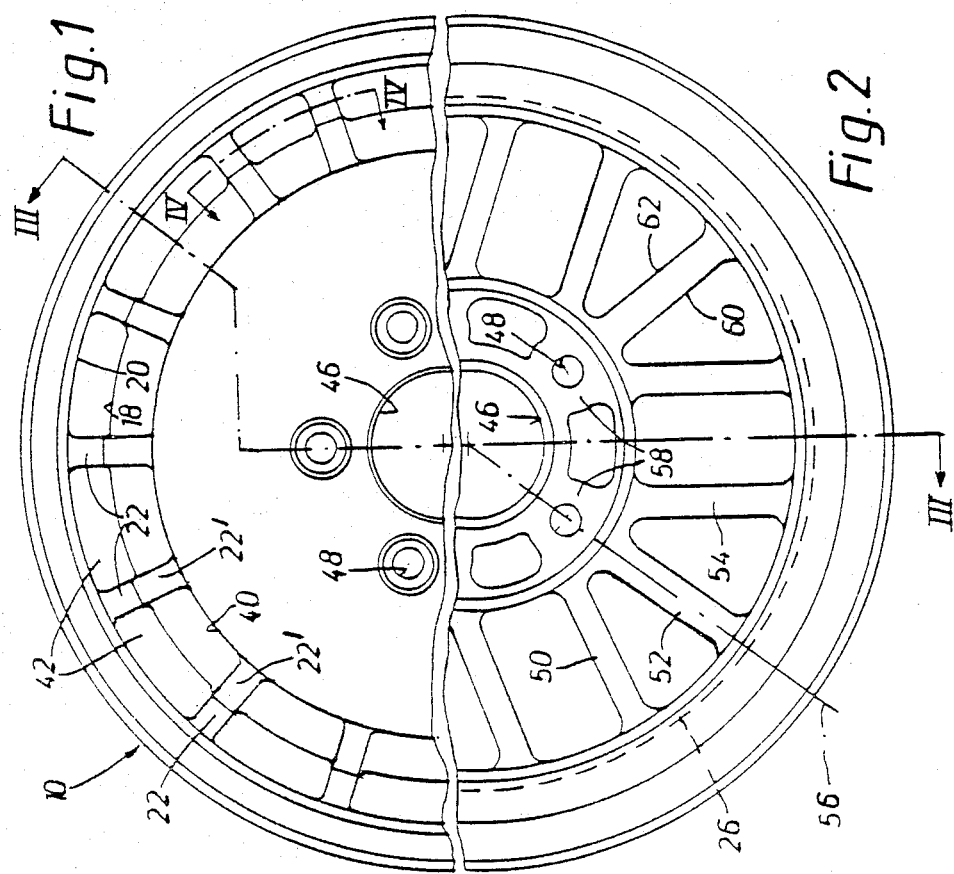
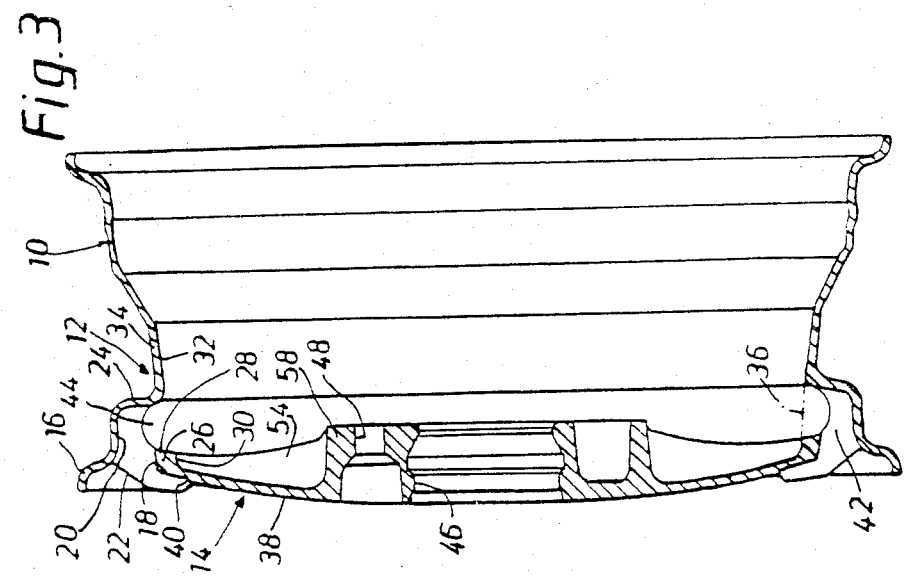

DISC WHEEL WITH VENTILLATION PASSAGES

BACKGROUND AND SUMMARY OF THE INVENTION

The invention relates to a wheel for motor vehicles, of the type which is cast or forged in one piece, and composed, in particular, of a light metal alloy, this wheel possessing a rim and a wheel disc, a radial clearance being present between the periphery of the wheel disc and the rim, which clearance is bridged by connecting webs.

Motor vehicle wheels of the design described above are already known (German Offenlegungsschriften 1,802,298 and 2,853,606).

The above-mentioned publications are concerned with designs in which the radial clearance between the wheel disc and the rim is utilized in order to form air exit apertures, which are located between the connecting webs, and through which streams of air can flow away, this flowing air serving to cool the disc brake which is installed in the region of the wheel disc. For this purpose, the connecting webs on the rear surface of the wheel disc, and, if appropriate, on its front surface, extend radially inwards and function in conjunction with the wheel disc in the manner of a radial fan.

In these known embodiments, the forces which become active at the wheel are transmitted via the connecting webs into the wheel rim as the vehicle is driven under power, or are transmitted into the wheel disc when the vehicle is being pushed, it being necessary to design the wheel disc and/or the connecting webs with appropriate dimensions so as to achieve the necessary strength.

Moreover, motor vehicle wheels possessing the features of the design referred to above also belong to the state of the art, a fact which cannot be substantiated by means of publications, but which is known from practice, in which designs the connecting struts extend merely between the external periphery of the wheel disc and the internal periphery of the rim in the region of a rim-bead.

This design necessitates that the wheel disc be designed with appropriately generous dimensions, in order to ensure that the connecting webs are equally stressed. This requirement, however, conflicts with efforts, prompted by reasons of cost, to reduce the amount of material required for the wheels, and especially for wheels composed of expensive light metal alloys. An object on which the invention is based is accordingly, on the one hand, to make it possible to produce wheel discs which are, at least locally, considerably thinner and, on the other hand, to bring about a further increase in the stiffness of wheels of this type, as a result of a detail-improvement in their construction.

These objects are achieved according to the invention by means of a design wherein a stiffening ring, extending both peripherally and axially, is moulded onto the inner surface of the wheel disc, and the connecting webs are moulded onto the outer, annular surface of the stiffening ring, this surface forming the peripheral surface of the wheel disc.

Furnishing the wheel disc with a stiffening ring, which is moulded onto the disc in its peripheral zone, ensures that the wheel is stiffened to the extent necessary for equal stressing of the connecting webs, even in cases where the wheel disc is of comparatively thin-walled design.

In the axial direction, the stiffening ring can extend up to a front end-wall portion of the rim, and can if appropriate, merge integrally into this end-wall portion, in which case the wheel possesses no window-like apertures. The wheel will preferably be furnished with apertures of this nature in order to enable streams of air to form as the wheel rotates, these streams of air being drawn off via these apertures for the purpose of cooling the brakes. For this purpose, the stiffening ring must be designed in a manner such that openings are made in it, in the radial direction, between the connecting webs. This presupposes that the connecting webs extend to the front end-wall portion of the rim. However, it is also contemplated to design the stiffening ring in a manner such that it is shortened in the axial direction, so that a clearance extending in the peripheral direction is present between this ring and the front end-wall.

An object which is to be achieved by means of the invention relates more specifically to the further development of an internally-ventilated wheel, in which the connection of the ventilation passages, present between the connecting webs, to the wheel interior is invisible when the wheel is viewed from the front, the purpose of which is to produce a wheel having a front, outside face possessing a shape which is particularly outstanding in aesthetic terms, while the outer surface of this wheel is less extensively soiled by the brake-friction material which is rubbed off during braking, and is distinguished by high strength, deriving from its shape, despite the fact that its design leads to a saving in materials.

This object is achieved by means of disposition of the openings forming the exit apertures of the ventilation passages, with these apertures being directed into the wheel interior so that they do not, due to the fact that they run radially, fall into the field of view. The stiffening ring produces the desired additional stiffening of the wheel disc, thus enabling it to be designed with a particularly thin wall. In addition, the stiffening ring forms on the wheel disc an appropriately dimensioned connection-base for the connecting webs. Finally, a portion of the brake friction-material which is rubbed off during braking can, under the influence of inertia, deposit on the inner periphery of the stiffening ring, and is consequently prevented from escaping at the ventilation apertures.

In terms of foundry technology, it is possible to produce the arrangement embodying apertures along the periphery of the stiffening ring, extending radially, but the production of such a casting necessitates that the mould be equipped with appropriate gates which can be moved radially, or with other adequate devices which complicate the construction of the mould and render it correspondingly more expensive. Equipping the mould in this way can be avoided by conventionally machining a cast wheel, in which, in accordance with the above proposal the connecting webs extend in the axial direction up to the front end-wall portion of the rim. This machining operation must be carried out on the internal periphery of the stiffening ring and, in particular, this operation necessitates the machining of an annular slot into the inner peripheral surface of the stiffening ring, this slot finally breaking through the ring in the radial direction, so that in the end the wheel disc is connected to the rim only via the connecting webs which remain intact. This measure is regarded as a manufacturing process which is independently worthy of patent protection within the scope of the present invention.

In addition, the machining procedure for the production of window-like air exit apertures as described above permits the front, outside face of the wheel to be given an unusual shape, in that the apertures which can be produced by the conventional machining operation adjoin the annular, outside face of the stiffening ring produced by this operation in the axial direction and consequently open radially into the interspace between the wheel disc, or, as the case may be, the stiffening ring, and the rim. Insofar as the rim is of the type which is furnished with a deep base, it is advantageous with regard to the machining operation on the stiffening ring as explained, to arrange the inner peripheral surface of the stiffening ring and the inner peripheral surface of the deep rim base, one with respect to the other, in a manner such that they lie on a common shell surface. Before the machining operation, the two inner peripheral surfaces thus form a continuous inner peripheral surface of the wheel, enabling undercutting to be avoided during casting or forging. At the same time, optimal flow of the materials from the stiffening ring to the rim is achieved, especially for a wheel which is manufactured by casting.

In the case of a wheel which possesses window-like apertures, arranged as explained between the connecting webs which join the wheel disc to the rim, the stiffening ring on the wheel disc brings about the additional advantage that the rubbed-off brake friction material produced during braking can deposit, under the influence of inertia, on the internal periphery of the stiffening ring, as a result of which soiling of the outer surface of the wheel is correspondingly reduced.

These and further objects, features, and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 shows a front view of the outside face of one half of a wheel constructed in accordance with a preferred embodiment of the invention, FIG. 2 shows a front view of the rear face of the other half of the wheel of FIG. 1, FIG. 3 shows a cross section through the wheel along the line III—III and through the other front face half of the wheel which is not shown in FIGS. 1 and 2.

DETAILED DESCRIPTION OF THE DRAWINGS

Figure 4:
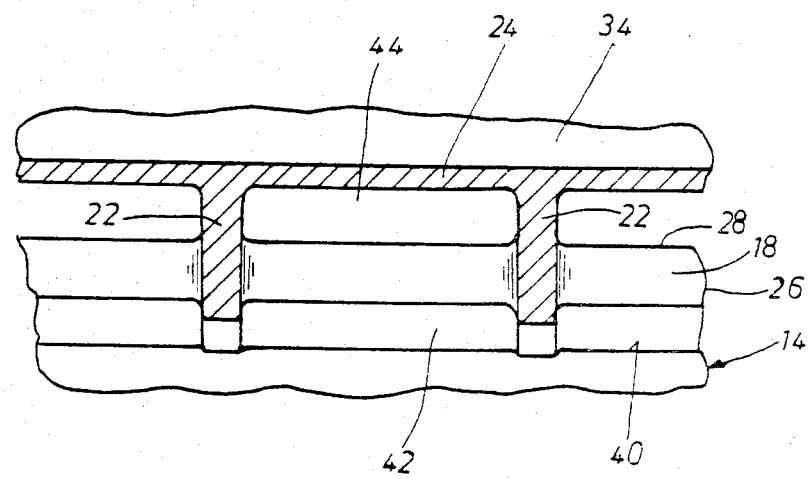
FIG. 4 shows a partial section, along the line IV—IV in FIG. 1, on a larger scale.

In the drawing, a wheel rim is marked 10 in its entirety, this rim being furnished with a deep base 12. A wheel disc is marked 14 in its entirety, the bulk of this wheel disc preferably being located within a front rim-bead 16. The outer peripheral surface 18 of wheel disc 14 is radially displaced relative to the inner peripheral surface 20 of the front rim-bead 16, the clearance being bridged by a large number of connecting webs 22. Webs 22 are located at uniform angular intervals and are moulded, on the one hand, onto the outer peripheral surface 18 of the wheel disc 14 and, on the other hand, onto both the inner peripheral surface 20 of the rim-bead 16 and an end-wall portion 24, the latter being pointed towards the interior of the wheel and forming the front, annular bounding wall of the deep base 12.

The outer peripheral surface 18 of the wheel disc 14 simultaneously forms the outer, annular surface of a stiffening ring 26 which is moulded onto the inner surface of the wheel disc, extending peripherally and extending inwards in the axial direction, the inner, annular outside face 28 of this ring 26 being axially displaced from the end-wall portion 24 of the rim.

Furnishing the wheel disc in its peripheral zone with the stiffening ring 26 enables the wheel disc to be designed with a comparatively thin wall, while nevertheless rendering the wheel sufficiently stiff to ensure that the connecting webs 22 are subjected to equal stresses when forces are being transmitted from the wheel disc to the wheel rim or vice versa.

As can be seen from FIG. 3, the arrangement of the stiffening ring 26, relative to the deep rim base, is designed to be such that the inner peripheral surface 30 of the stiffening ring and the inner peripheral surface 32 of the annular deep bed wall-portion 34 which extends essentially in the axial direction, lie on a common shell surface 36 which is indicated in FIG. 3 by a dash-dot line, and which tapers conically towards the wheel disc. This arrangement enables advantages to be obtained which relate to the production technology as already mentioned in the introduction, and which will be discussed further at a later point.

In accordance with points of view relating to the design of the wheel disc 14 in terms of its shape, the wheel disc is preferably designed to be slightly domed in the outward direction, and it is arranged, relative to the wheel rim, in a manner such that at least that zone of its front, outside face 38 which is near the periphery is located inside the radial projection of front rim-bead 16. As can be seen in this context from FIGS. 1 and 3, the connecting webs 22 are drawn downwards over this zone of the front, outside face 38 of the disc, this zone preferably being set-off visually from the remaining portion of the outside face by means of a circular step-feature 40, of low-relief design.

The desired stiffening of the wheel is further increased by the web-portions 22' of the connecting webs 22, these portions being drawn down over this surface zone of the disc, the connecting webs being integral both with the rim and the wheel disc, in that the stiffening ring 26 provides the connecting webs with a corresponding extension or reinforcement in the radial direction.

Due to the fact that a clearance is provided between the annular outside face 28 of the stiffening ring 26 and the end-wall portion 24 of the deep base 12 of the rim, there is a connection from the inner surface of the wheel to window-like, recessed regions 42 (FIG. 1), which are accessible from the front outside face of the wheel, extend peripherally, and are defined by the peripheral surfaces 18, 20 of the wheel disc 14 and of the rim-bead 16, as well as by mutually adjacent connecting webs 22. The openings which create the above-mentioned connection are invisible when the wheel is viewed from the front, since, as FIG. 3 shows, the external diameter of the stiffening ring 26 exceeds the smallest internal diameter of the deep base 12 of the rim. The openings thus extend in the radial direction between the stiffening ring 26 and the end-wall portion 24 of the deep base of the rim. In consequence, when the wheel is viewed as mentioned above, the openings leading into its interior cannot be noticed immediately, since, on the contrary, the view inside the recessed regions 42 falls on the end-wall portion 24 of the deep base of the rim, thus imparting a particularly tasteful accent to the appearance of the wheel.

In FIG. 4, the openings are marked 44. Together with the recessed regions 42 they form air-ducting passages through which streams of air, forming as the wheel rotates, can flow away from the interior of the wheel to the outside, in order to cool a wheel brake.

The design of the wheel is advantageously laid out in a manner such that, for casting or forging the wheel, none of the measures for shaping-out the openings 44, which measures render manufacture more expensive, need to be applied to the mould or, as the case may be, to the die. On the contrary, the chosen wheel design makes it possible to form a continuous peripheral wall between the wheel disc and the deep base of the rim, so that on the blank the stiffening ring 26 integrally adjoins the end-wall portion 24, thereby facilitating the casting operation or, as the case may be, the forging operation. At the same time, in the case of a cast wheel, the material flows into the rim in the optimum manner.

In order to produce the openings 44, the blank must afterwards be machined with conventional machining tools but in a special manner, for example by relief-turning, in the interior of the wheel, in the zone between the end-wall portion 24 and the annular outside face 28 of the stiffening ring 26, it being necessary to remove material in the radial direction, until the stiffening ring is severed and, at the same time, the openings 44 are produced as a necessary consequence of this operation.

In a further advantageous embodiment of the wheel, the wheel disc 14 is furnished with stiffening ribs which enable, on the one hand, the wall of the wheel disc to be thinned still more and, on the other hand, enable its stiffness to be yet further increased. For this purpose, three reinforcing ribs 50, 52, 54 are preferably assigned, in each case, to the drilled wheel-bolt holes 48 which are grouped around an axial bore 46 in the wheel disc at a radial distance, in such a manner that these reinforcing ribs converge towards the drilled wheel-bolt hole 48 in question, the central reinforcing rib 52 being positioned in a manner such that its longitudinal axis is located in the plane 56 which is defined by the axis of the axial bore 46 and the axis of the drilled wheel-bolt hole 48 in question. At the same time, the angular positions of the two outer reinforcing ribs 50, 54, relative to the central reinforcing rib 52, are chosen in a manner such that the reinforcing ribs which are assigned in groups to the drilled wheel-bolt holes 48, are moulded onto the internal periphery of the stiffening ring 26 at uniform angular intervals, and line up, in each case, with one of the connecting webs 22. At their other ends they are, in each case, moulded onto a wheel-attachment boss 58 on the wheel disc, this boss receiving the drilled wheel-bolt hole 48 assigned thereto. The arrangement of ribs as described optimizes the force-flux between the wheel disc and the wheel rim, the ribs producing the shortest connection from the connecting webs 22 to the wheel-attachment bosses 58, which ensures that the reinforcing ribs can absorb the bending moments which become active in a correspondingly advantageous manner. Moreover, the arrangement of ribs as described, does not require that they form a network, and this offers advantages from the production technology point of view.

The ribs are preferably furnished with parallel longitudinal edges 60/62, and are rectangular in cross-section, their height preferably increasing smoothly towards the wheel-attachment boss 58 which is assigned to them, this making a further contribution to increasing the stiffness of the wheel disc.

While we have shown and described the embodiment in accordance with the present invention, it is understood that the same is not limited thereto but is susceptible to numerous changes and modifications as would be known to those skilled in the art of the present disclosure and we therefore do not wish to be limited to the details shown and described therein but intend to cover all such changes and modifications as are encompassed by the scope of the appended claims.

We claim:

1. A wheel for motor vehicles exhibiting in use a front face facing outwardly and a rear face facing inwardly of a vehicle, comprising:
    a rim defining an interior wheel space for accommodating brake means and the like, said rim having an inner diameter deep bed wall-portion at the minimum diameter of the rim,
    a wheel disk disposed adjacent to said rim to form an annular gap between said wheel disk and rim,
    said wheel disk including a stiffening ring, and
    radial connecting webs bridging the annular gap between said rim and said wheel disk, said connecting webs subdividing the annular gap into individual ventilation passages, said passages having exit apertures into the interior of the wheel,
    wherein said ventilation passages extend radially from outside the wheel disk and stiffening ring to respective exit apertures opening to the interior wheel space,
    wherein the wheel disk and stiffening ring exhibit a minimum diameter at the ventilation passages which is approximately equal to the inner diameter of the deep bed wall-portion of the rim, such that said exit apertures are not visible from the front face, and such that contaminating particles are inhibited from traveling through the ventilation passages to the front face of the wheel.

2. Wheel according to claim 1, wherein the stiffening ring is provided with the radial opening exit apertures.

3. Wheel according to claim 2, wherein the external diameter of the stiffening ring is at least equal to the inner diameter of the deep bed wall-portion of the rim.

4. Wheel according to claim 3, wherein the stiffening ring and the deep bed wall-portion of the rim lie on a common shell surface.

5. Wheel according to claim 4, wherein said rim has an end wall-portion axial to the deep wall-portion and displaced toward the front face from the deep wall-portion, wherein said connecting webs extend from the said wheel disk and said stiffening ring axially up to said end-wall portion in the interior of the wheel.

6. Wheel according to claim 3, wherein said rim has an end wall-portion axial to the deep wall-portion and displaced toward the front face from the deep wall-portion, wherein said connecting webs extend from the said wheel disk and said stiffening ring axially up to said end-wall portion in the interior of the wheel.

7. Wheel according to claim 2, wherein said rim has an end wall-portion axial to the deep wall-portion and displaced toward the front face from the deep wall-portion, wherein said connecting webs extend from the said wheel disk and said stiffening ring axially up to said end-wall portion in the interior of the wheel.

8. Wheel according to claim 1, wherein the external diameter of the stiffening ring is at least equal to the inner diameter of the deep bed wall-portion of the rim.

9. Wheel according to claim 8, wherein the stiffening ring and the deep bed wall-portion of the rim lie on a common shell surface.

10. Wheel according to claim 9, wherein said rim has an end wall-portion axial to the deep-wall portion and displaced toward the front face from the deep wall-portion, wherein said connecting webs extend from the said wheel disk and said stiffening ring axially up to said end-wall portion in the interior of the wheel.

11. Wheel according to claim 8, wherein said rim has an end wall-portion axial to the deep wall-portion and displaced toward the front face from the deep wall-portion, wherein said connecting webs extend from the said wheel disk and said stiffening ring axially up to said end-wall portion in the interior of the wheel.

12. Wheel according to claim 1, wherein said rim has an end wall-portion axial to the deep wall-portion and displaced toward the front face from the deep wall-portion, wherein said connecting webs extend from the said wheel disk and said stiffening ring axially up to said end-wall portion in the interior of the wheel.

* * * * *